US007280925B1

(12) United States Patent
Eker et al.

(10) Patent No.: US 7,280,925 B1
(45) Date of Patent: Oct. 9, 2007

(54) INSTALLED INSTRUMENTATION MAINTENANCE METHOD

(75) Inventors: Jeffrey T. Eker, Haddonfield, NJ (US); Shawn A. Egnak, Haddonfield, NJ (US); Charles L. Savage, Holland, PA (US); Margaret A. Connolly, Springfield, PA (US); Vincent L. DiFilippo, Wallingford, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 150 days.

(21) Appl. No.: 11/025,825

(22) Filed: Dec. 29, 2004

Related U.S. Application Data

(60) Provisional application No. 60/558,899, filed on Apr. 2, 2004.

(51) Int. Cl.
*G01B 3/44* (2006.01)
*G06F 11/30* (2006.01)

(52) U.S. Cl. .......................... 702/34; 702/184; 700/99; 707/104.1

(58) Field of Classification Search .................. 702/34, 702/182, 184, 185; 700/99; 701/29; 707/104.1; 714/43; 60/772
See application file for complete search history.

(56) References Cited

U.S. PATENT DOCUMENTS

| | | |
|---|---|---|
| 5,856,931 A | 1/1999 | McCasland |
| 6,411,908 B1 | 6/2002 | Talbott |
| 6,594,621 B1 | 7/2003 | Meeker |
| 6,742,000 B1 | 5/2004 | Fantasia et al. |
| 6,820,038 B1 * | 11/2004 | Wetzer et al. ............... 702/184 |
| 6,847,854 B2 | 1/2005 | Discenzo |
| 6,871,160 B2 | 3/2005 | Jaw |
| 2003/0004765 A1 | 1/2003 | Weigand |
| 2003/0120402 A1 | 6/2003 | Jaw |
| 2004/0049715 A1 | 3/2004 | Jaw |
| 2004/0176929 A1 | 9/2004 | Joubert et al. |
| 2004/0267395 A1 | 12/2004 | Discenzo |
| 2005/0143956 A1 | 6/2005 | Long et al. |

OTHER PUBLICATIONS

U.S. Appl. No. 60/558,899, filed Apr. 2, 2004, invention entitled "Installed Instrumentation Maintenance Method," joint inventors Jeffrey T. Eker, Shawn A. Egnak, Charles L. Savage, Margaret A. Connolly and Vincent L. DiFilippo.

* cited by examiner

*Primary Examiner*—John Barlow
*Assistant Examiner*—John Le
(74) *Attorney, Agent, or Firm*—Howard Kaiser

(57) ABSTRACT

The present invention's efficient and economical maintenance strategy for a system of operation (such as involving various kinds of instrumentation) features a unique decision-making logic that incorporates reliability-centered maintenance principles. The initial logical inquiry filters out the non-critical cases, i.e., those instruments the failure of which does not jeopardize or compromise safety, or the environment, or an important function or operation. The logical construct proceeds as to the remaining (unfiltered) instruments in a series of logical steps wherein the satisfaction of one or more given conditions by a subject instrument directs the practitioner to the appropriate maintenance action for the subject instrument. Possible maintenance actions include the following: comparison check of the instrument with respect to the primary instrument; system operational check; repair of the instrument; replacement of the instrument; maintenance deferral until a scheduled failure finding task; system calibration procedure; individual maintenance procedure (on-site or off-site).

6 Claims, 6 Drawing Sheets

| SECTION A – INSTRUMENT APPLICABILITY ||| 
|---|---|---|
| 1. | Is this instrument duplicating a parameter monitored elsewhere? | (B2) |
| 2. | Is this the primary monitoring location? | (B3) |
| 3. | Is instrument required for day-to-day trending/monitoring? | (A5) |
| 4. | Is instrument required for sub-system testing or PMS? | (A6) |
| 5. | Is this instrument used only in trouble-shooting? | (B6) |
| 6. | Does this instrument need to provide a specific quantitative value of the parameter (is an exact number needed)? | (B4) |
| 7. | Does it provide a stimulus needed for proper system operation/function?<br>a) Does it direct an action such as opening a valve or starting a pump?<br>b) Does this action need to occur at an exact number? | (A4) |
| 8. | If instrument need has not been justified by the above questions, why is it needed? | (M1) |
| SECTION B – INSTRUMENT NEED, CALIBRATION PERIODICITY EXTENSION |||
| 9. | Based on your experience, which instruments can be removed from the system? | (M1) |
| 10. | Do past "as found" conditions support consideration of interval extension/maintenance deferral? | (B7) |
| 11. | Would loss of instrument result in loss of equipment or significant loss of system functionality? | (A3) |
| 12. | Would loss of equipment or functionality significantly degrade ship mission capability? | (A3) |
| SECTION C – INSTRUMENT MAINTENANCE |||
| 13. | If calibration and adjustment is deemed necessary, is there any reason that the instrument must be removed for calibration (versus calibrate in place)? | (B10) |
| 14. | Should maintenance be accomplished on a periodic basis or conditional basis? | (B6) |
| 15. | If instrument is only used for troubleshooting, does it also need to be calibrated periodically? | (B8) |
| 16. | What accuracy is required for acceptable monitoring/operation of system/equipment (1% procurement MIL-SPEC, less or greater)? | (M6-M8) |
| 17. | Is the indicator used for monitoring of a threshold or a range?<br>a) Is accuracy needed at "set point" or over the range of the instrument?<br>b) Does accuracy for range differ from that of "set point"? | (M6-M8) |
| 18. | Is there a simpler method of detecting and adjusting that could accomplish the desired results? | (B5, M2-M4) |
| 19. | Is there any application where you would detect and not adjust (assuming out of tolerance)? | (M5) |
| SECTION D – INSTRUMENT CRITICALITY |||
| 20. | Is there a risk of safety to life or limb if this specific instrument fails to accurately monitor/stimulate the system? | (A1) |
| 21. | Is there a risk of environmental impact (fine/jail) if this specific instrument fails to accurately monitor/stimulate the system? | (A2) |

FIG. 5

| NOMEN | QUESTIONS → FUNCTION | 1 | 2 | 3 | 4 | 5 | 6 | 7 | 8 | 9 | 10 | 11 | 12 | 13 | 14 | 15 | 16 | 17 | 18 | 19 | 20 | 21 | REMARKS |
|---|---|---|---|---|---|---|---|---|---|---|---|---|---|---|---|---|---|---|---|---|---|---|---|
| Press Gage | Discharge | no | yes | yes | no | yes | no | no | N/A | no | no | no | no | no | periodic | yes | 3% | both | no | no | no | no | DSC |
| Press Gage | Air Discharge | no | yes | yes | no | yes | yes | yes | N/A | no | no | no | no | no | periodic | yes | 3% | both | no | no | no | no | DSC |
| Press Gage | Oil | no | yes | yes | yes | no | yes | no | N/A | no | no | no | no | no | periodic | yes | 3% | both | no | no | no | no | DSC |
| Light | Auto-Man Cont Light | no | yes | no | no | no | yes | no | N/A | no | no | yes | no | no | N/A | both | N/A | both | no | no | no | no | DSC |
| Press Sw | Oil Discharge | no | yes | no | yes | no | no | yes | N/A | no | no | yes | no | no | periodic | N/A | 1% | thresh | no | no | no | no | PMS |
| Press Sw | Auto On/Off Cont | no | yes | no | yes | no | no | yes | N/A | no | no | no | no | no | periodic | N/A | 1% | thresh | no | no | no | no | PMS |
| Rem Therm | Air Discharge | no | yes | yes | no | yes | yes | yes | N/A | no | no | no | no | no | periodic | yes | 3% | both | no | no | no | no | DCIC |

FIG. 6

INSTALLED INSTRUMENTATION MAINTENANCE METHOD

CROSS-REFERENCE TO RELATED APPLICATIONS

This application claims the benefit of U.S. Provisional Application No. 60/558,899, filed 2 Apr. 2004, inventors Jeffrey T. Eker, Shawn A. Egnak, Charles L. Savage, Margaret A. Connolly and Vincent L. DiFilippo, invention entitled "Installed Instrumentation Maintenance Method," incorporated herein by reference.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to devices that require periodic maintenance such as involving calibration, more particularly to methods for systematically applying maintenance procedures to groups of such devices.

Four traditional maintenance strategies are "reactive" maintenance (also known as "run-to failure" maintenance), "preventive" maintenance (also known as "interval," "cycle-based," or "time-based" maintenance), "predictive" maintenance (also known as "condition-based" maintenance), and "proactive" maintenance. Reactive maintenance is most suitable for small or unimportant items or those that are redundant or unlikely to fail. Preventive maintenance is particularly appropriate for items that are subject to wearing out or those having a known pattern of failure. Predictive maintenance is considered to be superior to the other strategies when the item has a random pattern of failure, or is not subject to wearing out, or would be subject to failure induced by preventive maintenance were it implemented. Proactive maintenance usually involves root cause failure analysis (RCFA) or failure modes and effects analysis (FMEA).

In recent years a maintenance strategy known as "reliability centered" maintenance (RCM) has come into prominence. RCM seeks to optimally combine the four aforementioned strategies so as to take advantage of the respective strengths of each, thereby maximizing operability and efficiency of equipment and facilities while minimizing life-cycle costs. Essentially, RCM involves the integration of the four aforementioned strategies whereby actions are identified in order to increase cost-effectiveness and reduce probability of failure. The RCM process determines the maintenance requirements of any physical entity in the context of its operation, the overall goal basically being the provision of the required operation performance at the lowest cost. Implicit in RCM is its recognition that the various types of equipment in a typical operation will generally differ in terms of their importance as well as their failure probabilities and mechanisms. RCM analysis typically lends itself to formulation of a "decision logic tree" wherein equipment is considered with regard to (i) function, (ii) likely functional failures, (iii) likely consequences of functional failures, and (iv) action that can be taken to reduce the probability or consequences of failure, or to identify the onset of failure.

The U.S. Navy's customary method for conducting instrument calibration requirements analysis is pursuant to the Shipboard Instrumentation and Systems Calibration (SISCAL) program, which uses a logic tree almost identical to the "Calibration Decision Logic Tree" published in the Joint Fleet Maintenance Manual (JFFM, CINCLANTFLT/CINCPACFLTINST 4790.3) at Volume VI, Chapter 9, Appendix B-1 (formerly found at Volume IV, Chapter 12, Appendix C-1). The JFFM's Calibration Decision Logic Tree does not reflect reliability-centered maintenance (RCM) principles; in particular, it neither addresses installed instrument applications, nor considers appropriate instrument tolerances, nor considers maintenance actions alternative to calibration.

SUMMARY OF THE INVENTION

In view of the foregoing, it is an object of the present invention to provide an improved method for evaluating components in the context of an operating system of such components, e.g., such a method for evaluating instrumentation components in the context of a shipboard operating system of such instrumentation components.

According to typical embodiments of the present invention, an inventive method is provided for evaluating maintenance requirements of individual components in the context of an operational system. The inventive method comprises, with respect to each component, the following steps, to be performed as sequentially apposite: (a) considering whether failure of the component would be unsatisfactory in at least one aspect of the operating system, the aspect or aspects being functional, safety and/or environmental; and, (b) upon a positive determination that failure of the component would be unsatisfactory, considering (e.g., deciding) what maintenance action to take concerning the component. The consideration of what maintenance action to take includes the following steps to be performed, as sequentially apposite: (i) considering whether the component is either the only component of its kind or the primary component of its kind; (ii) upon a positive determination that the component is either the only component or the primary component of its kind, considering whether the instrument is quantitatively indicative; and, (iii) upon a positive determination that the component is quantitatively indicative, considering whether maintenance of the instrument is deferrable.

The present invention can be embodied as computer software. In accordance with some embodiments of the present invention, a computer program product is for evaluating maintenance requirements of individual components in the context of an operational system. The computer program product is for residence in the memory of a computer and comprises a computer useable medium having computer program logic recorded thereon, the computer program logic being applicable to each component. The computer program logic includes: (a) means for enabling consideration of whether failure of the component would be unsatisfactory regarding at least one aspect of the operational system selected from the group consisting of function, safety and environment; and (b) means for enabling consideration, upon a positive determination that failure of the component would be unsatisfactory, of what maintenance action to take concerning the component, wherein the means for enabling consideration of what maintenance action to take includes: (i) means for enabling consideration of whether the component is either the only component of its kind or the primary component of its kind; (ii) means for enabling consideration, upon a positive determination that the component is either the only component or the primary component of its kind, of whether the instrument is quantitatively indicative; and, (iii)

means for enabling consideration, upon a positive determination that the component is quantitatively indicative, of whether maintenance of the instrument is deferrable.

The present invention's methodology for evaluating maintenance requirements is founded on reliability-centered maintenance (RCM) principles. The inventors style the decision logic tree that typifies their invention an "Installed Instrumentation Maintenance Requirements and Maintenance Actions Logic" (I2MRMAL) Tree." According to frequent inventive practice, the inventive I2MRMAL Tree is accompanied by a questionnaire referred to by the inventors as the "Installed Instrumentation (INST2) Questions." The inventive INST2 Questions serve as a useful vehicle for facilitating practice of the inventive I2MRMAL Tree. The I2MRMAL Tree represents the present invention's logic; the INST2 Questions represent a tool for advancing the inventive process.

The inventive method represents an assessment mechanism that is uncomplicatedly practicable, yet complexly useful. Among the many possible applications, the present invention's assessment methodology can be used to perform engineering analysis on shipboard instrumentation in order to uniformly reduce calibration and maintenance requirements. For instance, by furthering reliability-centered maintenance goals, the present invention can potentially play an important role for the U.S. Navy in terms of providing decision-making models for maintenance of instrumentation operations. Inventive practice can thus significantly reduce the expenses (typically in millions of dollars) that the U.S. Navy incurs on instrumentation maintenance. It is noted in this regard that the present invention is the focal technical innovation of the 127-page Naval Sea Systems Command (NAVSEA) Shipboard Instrumentation and Systems Calibration (SISCAL) Transition Study Report, dated Jun. 2, 2003, incorporated herein by reference; see, e.g., the last paragraph of the Executive Summary.

Inventive applicability extends to foreign navies, commercial shipping, power industry, manufacturing industry, etc. By virtue of its scope and versatility and other attributes, the present invention has great potential for yielding significant cost benefits and other benefits. Reliability-centered maintenance (RCM) principles are effected by the inventive methodology. The present invention, inter alia, addresses installed instrument applications, determines appropriate instrument tolerances, and directs calibration or alternative maintenance actions. The present invention's method is applicable not only to an installed instrument but also to any other component. For instance, the U.S. Navy can apply the present invention to an installed instrument as well as to any other hull, mechanical and electrical (HM&E) component. Moreover, the present invention admits of practice in various other realms, such as those involving administrative, hardware, or project-logic processes.

Other objects, advantages and features of the present invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 3 and FIG. 4 together constitute the flow diagram shown in FIG. 2, wherein FIG. 3 is the "Maintenance Requirements Decision" section (on the lefthand side of the flow diagram shown in FIG. 2) and FIG. 4 is the "Maintenance Action Model" section (on the righthand side of the flow diagram shown in FIG. 2).

FIG. 5 is a tabular representation of questions, in accordance with the present invention, that are associated with the inventive flow diagram shown in FIG. 2 through FIG. 4.

FIG. 6 is an example of a chart that is completed, as to various types of instrumentation, in response to the inventive questions set forth in FIG. 5.

DETAILED DESCRIPTION OF THE INVENTION

Figure 1:
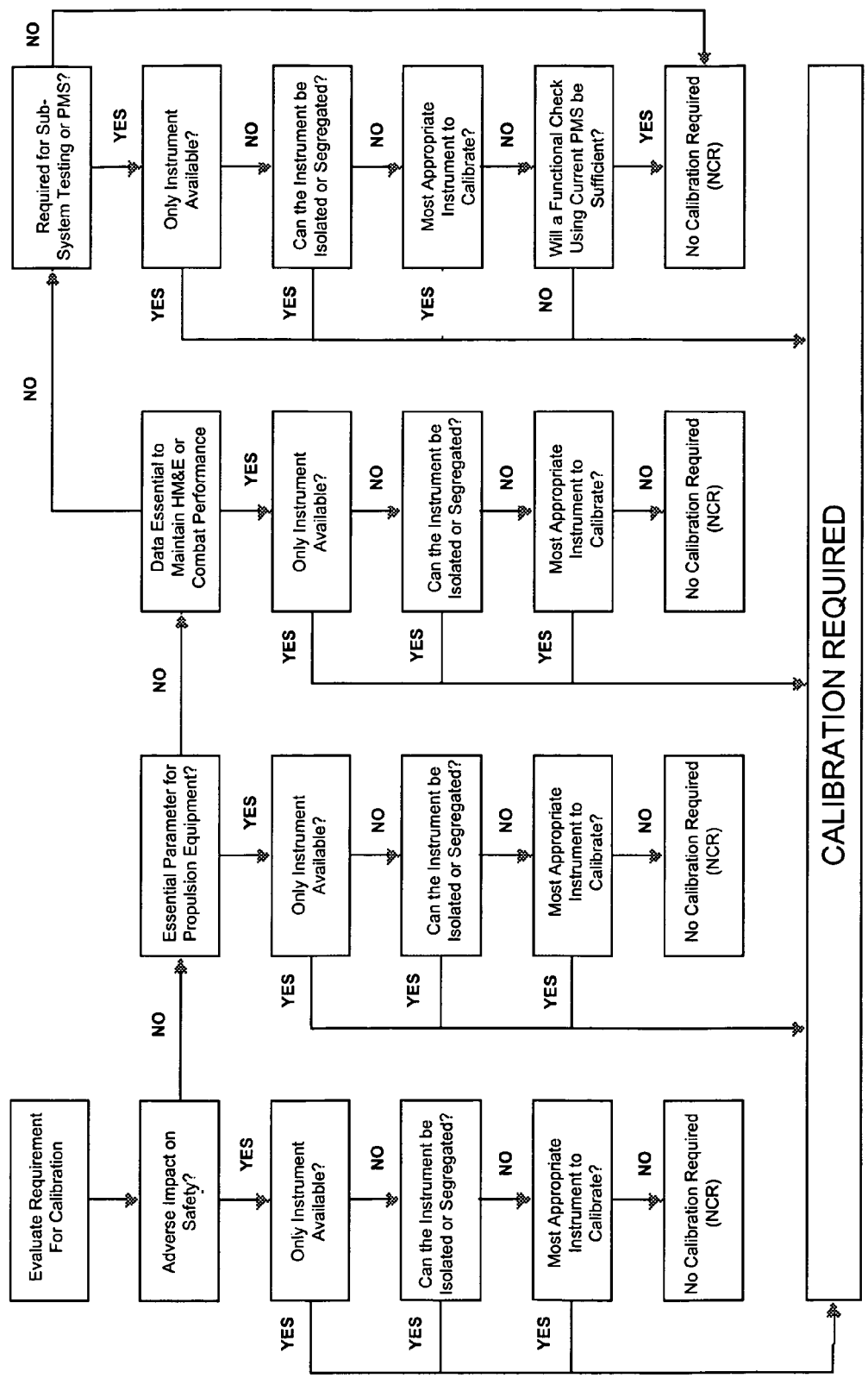
FIG. 1 is a flow diagram illustrating conventional calibration methodology such as practiced of the U.S. Navy.

Referring now to FIG. 1, the U.S. Navy currently implements an instrument maintenance strategy that separates calibration aspects from other maintenance-related aspects. The logic tree shown in FIG. 1 is the aforementioned duplicate of the "Calibration Decision Logic Tree" published in the Joint Fleet Maintenance Manual (JFFM, CINCLANTFLT/CINCPACFLTINST 4790.3) at Volume VI, Chapter 9, Appendix B-1. The U.S. Navy's currently conducts instrument calibration requirements analysis through its SISCAL Program, which uses a logic tree very similar to that shown in FIG. 1. As previously noted herein, the JFFM's Calibration Decision Logic Tree fails to effectuate reliability-centered maintenance (RCM) principles.

Figure 2:
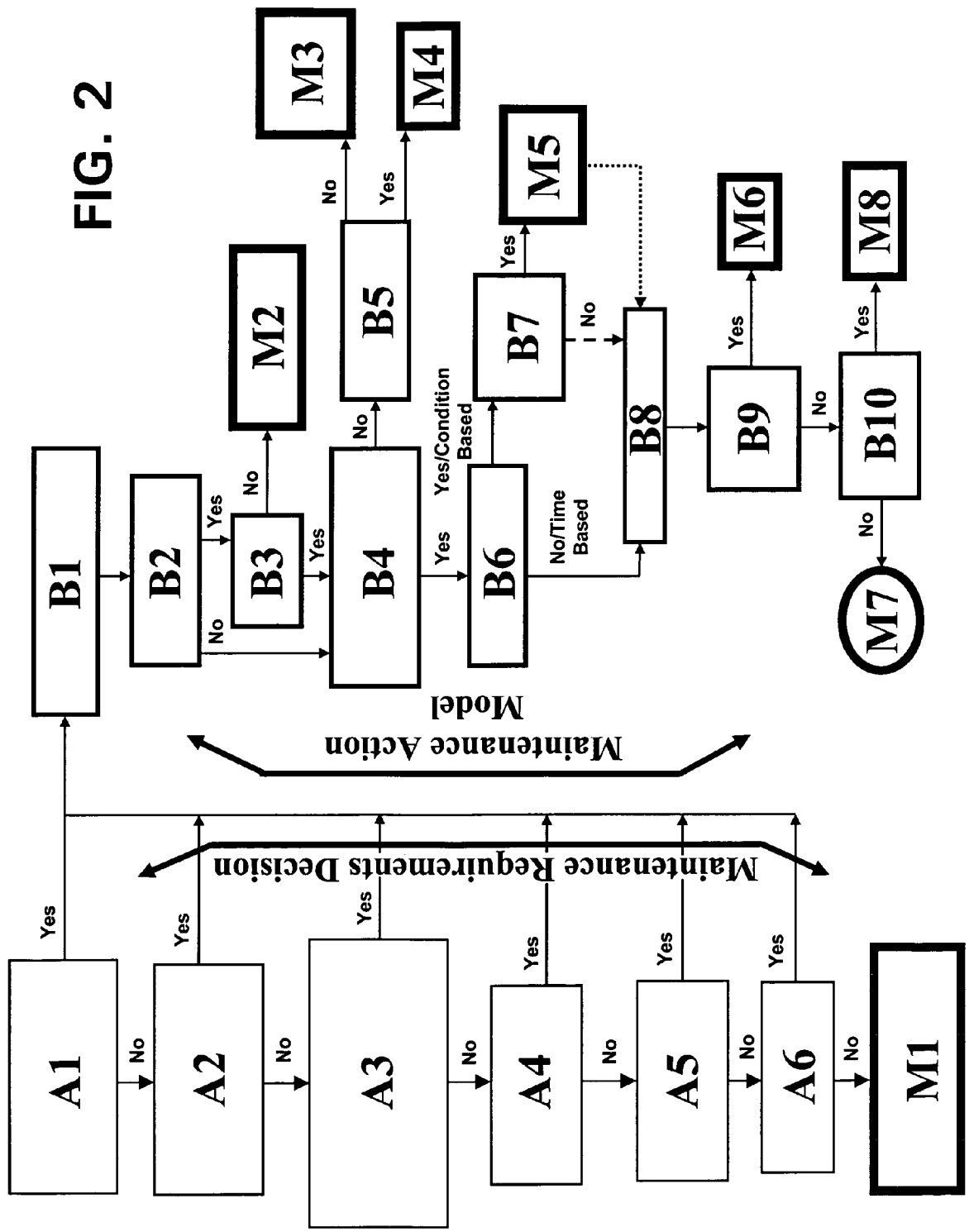
FIG. 2 is a flow diagram of an embodiment of a maintenance methodology in accordance with the present invention.
Figure 3:
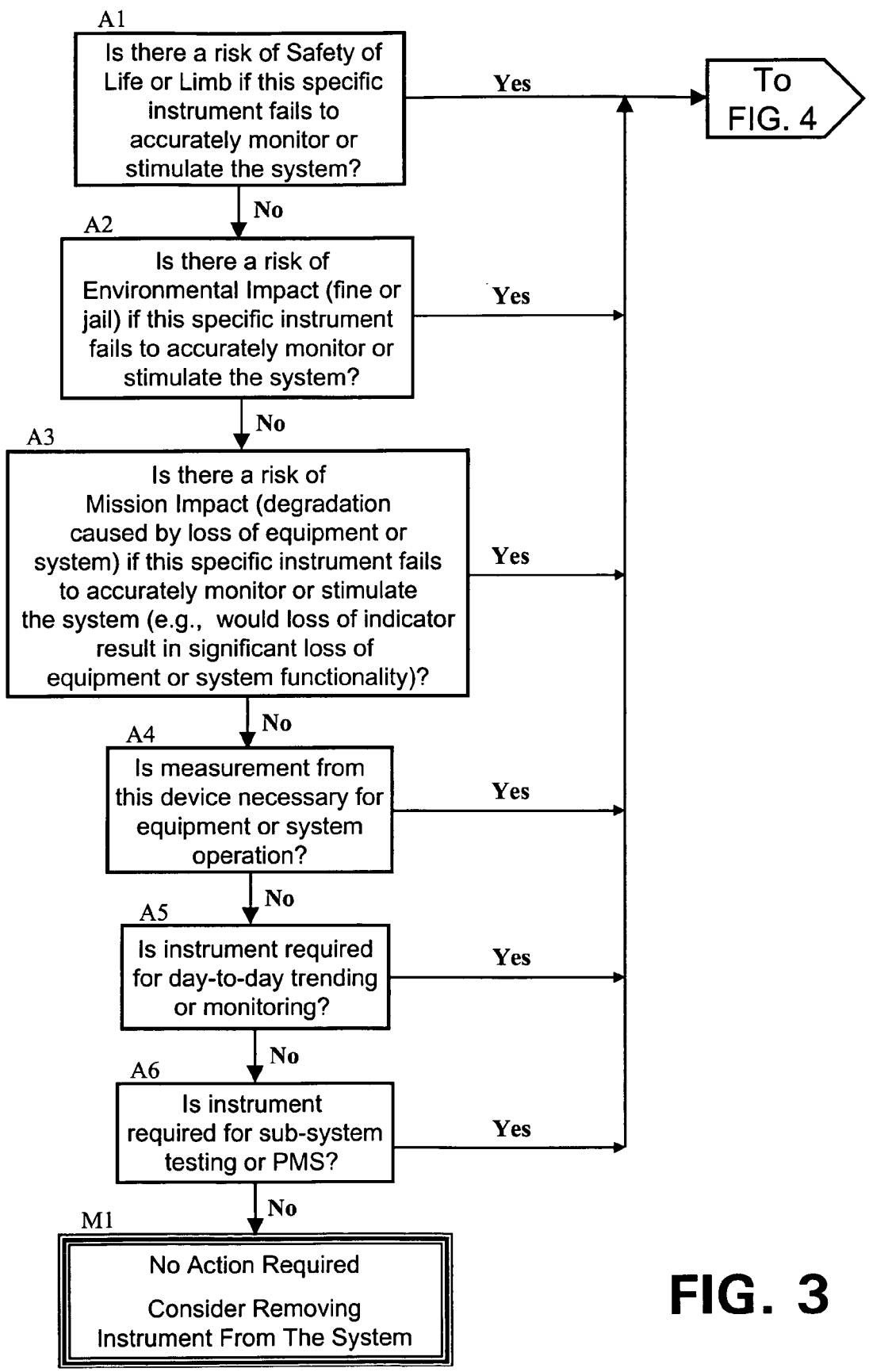
Figure 4:
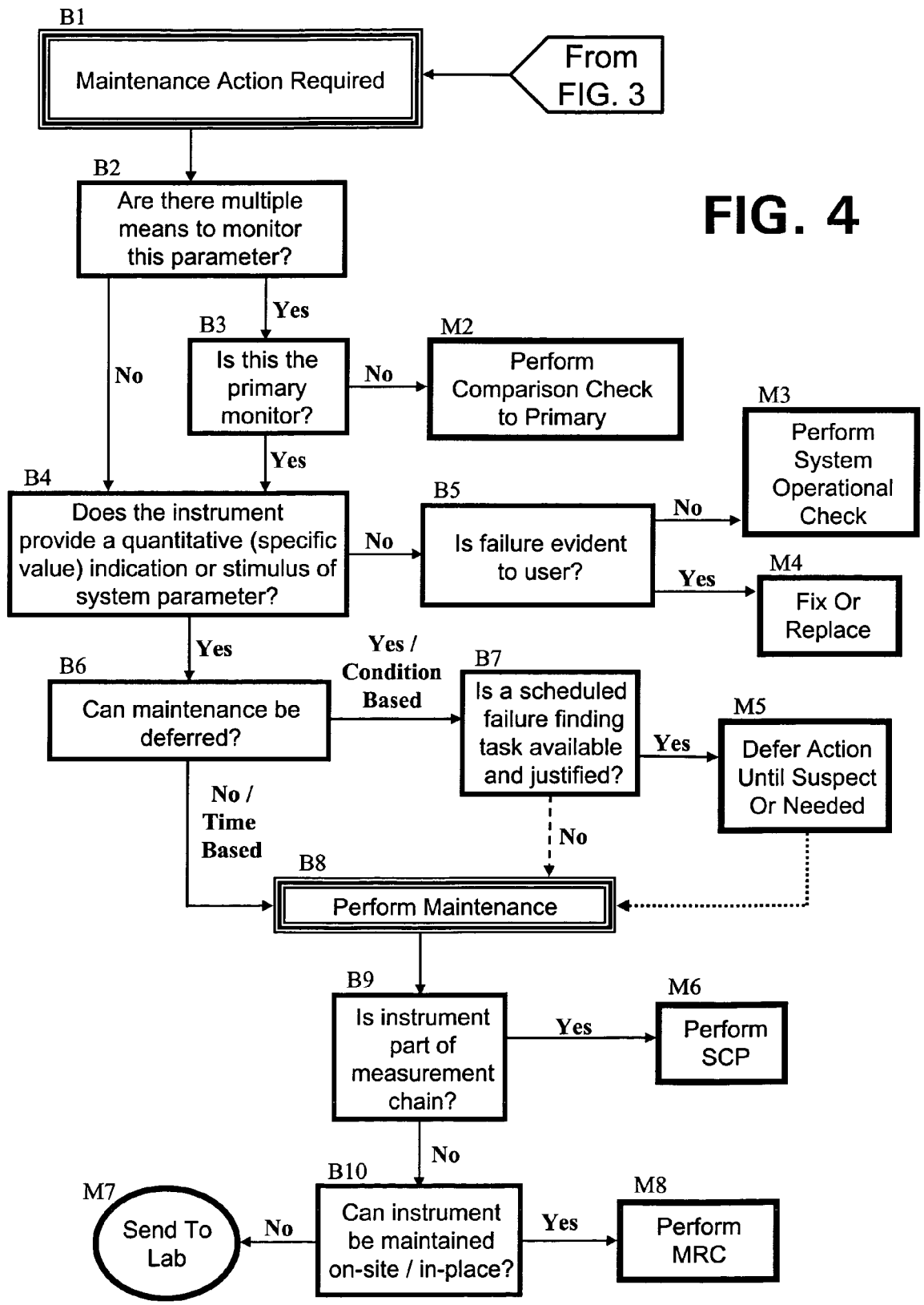

Reference is now made to FIG. 2 through FIG. 6, which are informative regarding the present invention. FIG. 2 through FIG. 4 illustrate the decision tree logic for a typical embodiment in accordance with the present invention. FIG. 2 is re-represented in two parts as FIG. 3 and FIG. 4. FIG. 5 shows an embodiment of an inventive questionnaire that enhances the decision logic tree of FIG. 2 through FIG. 4. FIG. 6 depicts a sample form, a kind of inventive device that can be used pursuant to an inventive questionnaire such as shown in FIG. 5. The I2MRMAL Tree shown in FIG. 2 through FIG. 4 demonstrates the rationale of the present invention. The accompanying INST2 Questions shown in FIG. 5 serve to facilitate the viability and comprehensibility of the inventive process.

The INST2 Questions shown in FIG. 5 are clearly sequenced and formatted (and can even be paged) so as to ease response and promote understanding on the part of the person (e.g., an in-service engineering agent, or ISEA) providing such input for inventive analysis. The INST2 QUESTIONS should be arranged in a logical sequence to extract the maximum information about the subject instrument. The four sections of the INST2 Questions shown in FIG. 5,—viz., (A) Instrument Applicability, (B) Instrument Need and Calibration Periodicity Extension, (C) Instrument Maintenance, and (D) Instrument Criticality—foster a comprehensive understanding of the instrument in terms of application, tolerance, and appropriate calibration or alternative maintenance action.

For instance, if a respondent were posed an "Instrument Criticality" INST2 question (corresponding, e.g., to block A1 or block A2 of the I2MRMAL Tree) at the beginning of the questionnaire, rather than in "Section D" as shown in FIG. 5, the respondent would be less likely to answer the question meaningfully; that is, the respondent would be inclined to reply along the lines of, "Of course we need the instrument! Why do you think the manufacturer installed it? If we are not able to monitor the parameter, the equipment might cause serious harm." Placement of the "Instrument Criticality" questions at the beginning rather than the end of the questionnaire would thus tend to impede inquiry into the true application of the instrument and its real maintenance requirements.

With reference to FIG. 2 through FIG. 4, the "A" series of blocks (blocks A1 through A6) of the I2MRMAL Tree set forth the various criteria in an initial inquiry toward an initial decision of whether or not any maintenance action at all is required; if any one of these factors obtains, maintenance action of some nature is required. If no maintenance action is required, the logic proceeds to block M1 of the "M" series of blocks. Block M1 urges consideration of the possibility of instrument removal from the operating system. If any action whatsoever is required, the logic proceeds to the "B" series of blocks (blocks B1 through B10), which directs toward the appropriate course of action (e.g., the minimum required maintenance action) selected from among blocks M2 through M8 in the "M" series of blocks. Blocks B1 through B10 guide or decipher toward the minimum required maintenance action. Blocks M2 through M8 each describe an individual maintenance action to be taken.

The "M" series action options include, for instance, performance of a comparison check to the primary monitor (block M2), or performance of an SCP (system calibration procedure) (block M6), or performance of an MRC (maintenance requirements card) (block M8). An MRC can be associated, for instance, with a PMS (planned maintenance system), a condition-based plural maintenance system, such an association being termed a PMS MRC (planned maintenance system maintenance requirements card). Generally, an MRC involves performing needed action with respect to a single instrument, whereas a PMS involves a more systematic mode of action, with respect to plural instruments.

While rendering the maintenance requirements decision depicted in FIG. 3, the inventive practitioner may encounter situations analogous to the following examples pertaining to blocks A1 through A6. If a gage on a high pressure air tank were not providing the proper indication, the tank might be over-pressured and perhaps rupture, thus causing death or serious injury (block A1). It is noted that the notion of safety in block A1 broadly encompasses the possibility of any kind of risk, danger, hazard, injury or unhealthful situation. If a gage on a fuel oil transfer line were not providing the proper indication, the line might rupture, resulting in a hazardous oil spill (block A2). If a chilled water flow switch unnecessarily shut down an air conditioning plant, the loss of chilled water cooling to combat systems equipment might cause a mission degradation (block A3). If a lube oil pump auto start switch did not function properly, the equipment would shut down (block A4). A gage measuring the pressure drop across a lube oil filter is used to determine/plan the maintenance to replace the filter (block A5). PMS requires the recording of the CPS (collective protection system) zone pressure gage readings on a monthly basis (block A6). It is noted that the notion of safety in block A1 broadly encompasses any injury or danger or risk to health of any kind.

Regarding block M1, when two types of instruments measure the same parameter, a question may arise as to whether to retain both types of instruments. For instance, two types of gages (local gages and remote gages) may have come as part of an original equipment manufacturer (OEM) package. It may be efficient to remove the unnecessary instrument, since its operation is extraneous or redundant. It may be of no consequence to leave the unnecessary instrument, since it would cause no harm and would not be maintained anyway. It may be "more trouble than it's worth" to uninstall the unnecessary component than to keep it.

In the maintenance action model section shown in FIG. 4, block B1 represents an affirmation that the instrument must be maintained. As an example of plural, duplicative means that monitor the same parameter, a parameter may have readout on a control panel and also on a local gage (block B2). Regarding block B3, one may ask which readout or readouts is or are most important; for instance, where the watch stander takes readings may be worthy of consideration in this regard. Blocks A1 through A6 determine that the instrument must be maintained; in contrast, block B3 presupposes that the instrument must be maintained, and delineates the significance of such maintenance. Block B3 directs performance of a comparison check (block M2) if the instrument is not the primary monitor, and directs further inquiry (beginning with block B4) if the instrument is the primary monitor.

An example of an instrument indicating a quantitative value is a switch that starts a lube oil pump at a particular pressure, e.g., 10 psi (block B4). An example of non-evident failure of a quantitatively indicative instrument is where the lube oil pressure never drops below a particular pressure, e.g., 10 psi; under these circumstances, one would not know whether the switch would start the pump (block B5). As an example of a case of non-evident failure, lube oil pressure can be induced in order to perform an operational check of a switch (block M3). As for a case of evident failure, the instrument can be either fixed or replaced, whichever is more practical or otherwise preferable (block M4).

If, for instance, maintenance is appropriately based on evidence of deterioration or failure, the answer to the maintenance deferral question in block B6 (Can maintenance be deferred?) is affirmative, leading to block B7. If, on the other hand, for instance, historical experience shows that the instrument fails after a certain period of time (e.g., 3000 hours), the answer to the maintenance deferral question in block B6 (Can maintenance be deferred?) is negative, leading to block B8. Typically, if a plant is routinely shut down (e.g., at selected intervals) to observe the operation of a switch (e.g., to observe a resultant fall in lube oil pressure), the answer is affirmative to the question posed in block B7, and action is deferred (block M5) to the scheduled failure-finding task unless other action is necessitated in the interim so as to perform only the minimum required maintenance. However, if failure of the switch would be catastrophic, or if loss of readiness or mission would result from a scheduled failure-finding task, the answer is negative to the question posed in block B7; under either of these circumstances, waiting until a scheduled failure finding task would not be justified.

Block B8 commences what may generally be described as encompassing a more traditional concept of maintenance actions. As an example of an instrument that is part of a measurement chain (block B9), the sensor in a tank that measures liquid level is part of an instrument chain that may have local readouts as well as readouts on a control panel. According to block M6, rather than perform maintenance on each instrument in an instrument chain, it is much more efficient to maintain the entire chain using a system calibration procedure (SCP). However, if the instrument cannot be isolated for maintenance, it might be necessary to remove the instrument in order to perform maintenance (block B10). Normally, instruments that must be removed for maintenance are sent to a lab (block M7). Per block M8, performing a planned maintenance system maintenance requirement card (PMS MRC) action on an installed instrument on site (e.g., in place) is not only efficient but also eliminates the possible introduction of errors and damage inherent in instrument removal procedures for maintenance purposes.

In the course of negotiating the "B" series of the present invention's I2MRMAL Tree, there is variation in the level of intricacy of the questioning that leads to some form of maintenance action. A negative response to block B3 directs one to a quick comparison check (block M2). Block B4 leads, in the alternative based on evidence of failure, to a operational check (block M3) or to a fix or replacement of the instrument (block M4). The operational check of block M3 is slightly or somewhat more time-consuming than is the comparison check of block M2. Block B6 commences the addressing of the concept of maintenance deferral. The present invention integrates maintenance deferral in the inventive process for good reason, since the maintenance concepts beginning at block B8 (which include traditional maintenance concepts) are the most labor-intensive and resource-intensive. Note that, generally as one progresses through the "B" blocks, the application and significance of the instrument require more comprehensive maintenance actions.

The present invention is not to be limited by the embodiments described or illustrated herein, which are given by way of example and not of limitation. Nor is the present invention to be limited in applicability to devices aboard marine vessels, as the present invention admits of practice relating to maintenance in association with multifarious devices in multifarious contexts. Other embodiments of the present invention will be apparent to those skilled in the art from a consideration of this disclosure or from practice of the present invention disclosed herein. Various omissions, modifications and changes to the principles disclosed herein may be made by one skilled in the art without departing from the true scope and spirit of the present invention, which is indicated by the following claims.

What is claimed is:

1. A method for delimiting maintenance requirements for components of an operational system, said method comprising: (a) designating, in written form, each component as being one of requiring maintenance action and not requiring maintenance action; and (b) designating, in written form, each component that requires maintenance action as requiring one of (i) comparison check of the component with respect to the primary component of its kind, (ii) system operational check for the component, (iii) repair or replacement of the component, (iv) deferred maintenance action for the component, (v) system calibration procedure for the component, (vi) maintenance action for the component performed on-site per maintenance requirements card associated with the component, and (vii) maintenance action for the component performed off-site at a laboratory; wherein a component requires maintenance action if failure of the component is unacceptable regarding at least one criterion selected from the group consisting of operational system function, safety, and environment; and wherein a component that requires maintenance action requires:

comparison check of the component with respect to the primary component of its kind, if the component is neither the only component of its kind nor the primary component of its kind;

system operational check for the component, if the component is one of the only component of its kind and the primary component of its kind, the component is not quantitatively indicative, and failure of the component is not evident;

repair or replacement of the component, if the component is one of the only component of its kind and the primary component of its kind, the component is not quantitatively indicative, and failure of the component is evident;

deferred maintenance action for the component, if the component is one of the only component of its kind and the primary component of its kind, the component is quantitatively indicative, condition-based maintenance strategy suggests that maintenance action for the component is deferrable, and deferring maintenance action for the component until a scheduled failure-finding task is justified;

system calibration procedure for the component, if the component is one of the only component of its kind and the primary component of its kind, the component is quantitatively indicative, condition-based maintenance strategy suggests that maintenance action for the component is deferrable, deferring maintenance action for the component until a scheduled failure-finding task is not justified, and the component is part of a measurement chain;

system calibration procedure for the component, if the component is one of the only component of its kind and the primary component of its kind, the component is quantitatively indicative, time-based maintenance strategy suggests that maintenance action for the component is not deferrable, and the component is part of a measurement chain;

maintenance action for the component performed on-site per maintenance requirements card associated with the component, if the component is one of the only component of its kind and the primary component of its kind, the component is quantitatively indicative, condition-based maintenance strategy suggests that maintenance action for the component is deferrable, deferring maintenance action for the component until a scheduled failure-finding task is not justified, the component is not part of a measurement chain, and maintenance action for the component can be performed on-site;

maintenance action for the component performed on-site per maintenance requirements card associated with the component, if the component is one of the only component of its kind and the primary component of its kind, the component is quantitatively indicative, time-based maintenance strategy suggests that maintenance action for the component is not deferrable, the component is not part of a measurement chain, and maintenance action for the component can be performed on-site;

maintenance action for the component performed off-site at a laboratory, if the component is one of the only component of its kind and the primary component of its kind, the component is quantitatively indicative, condition-based maintenance strategy suggests that maintenance action for the component is deferrable, deferring maintenance action for the component until a scheduled failure-finding task is not justified, the component is not part of a measurement chain, and maintenance action for the component cannot be performed on-site;

maintenance action for the component performed off-site at a laboratory, if the component is one of the only component of its kind and the primary component of its kind, the component is quantitatively indicative, time-based maintenance strategy suggests that maintenance action for the component is not deferrable, the component is not part of a measurement chain, and maintenance action for the component cannot be performed on-site.

2. The method for delimiting maintenance requirements as defined in claim 1, wherein at least one said component requires maintenance action.

3. A computer program product for residence in memory of a computer, said computer program product being for prescribing individualized maintenance approaches for instrumentation implemented in the context of an operational system, said computer program product comprising a computer useable medium having computer program logic recorded thereon, said computer program logic including:

means for enabling establishment of instrument characteristics, said instrument characteristics including: (a) the instrument is either the only instrument of its kind or the primary instrument of its kind; (b) the instrument is neither the only instrument of its kind nor the primary instrument of its kind; (c) the instrument is quantitatively indicative; (d) the instrument is not quantitatively indicative; (e) failure of the instrument is evident; (f) failure of the instrument is not evident; (g) condition-based maintenance strategy suggests that maintenance action for the instrument is deferrable; (h) time-based maintenance strategy suggests that maintenance action for the instrument is not deferrable; (i) deferring maintenance action for the instrument until a scheduled failure-finding task is justified; (j) deferring maintenance action for the instrument until a scheduled failure-finding task is not justified; (k) the instrument is part of a measurement chain; (l) the instrument is not part of a measurement chain; (m) maintenance action for the instrument can be performed on-site; (n) maintenance action for the instrument cannot be performed on-site; and means for enabling establishment of maintenance modes, said maintenance modes including: (1) comparison check of the instrument to be performed with respect to the primary instrument of its kind; (2) system operational check to be performed for the instrument; (3) repair or replacement of the instrument to be performed; (4) maintenance action for the instrument to be deferred; (5) system calibration procedure to be performed for the instrument; (6) maintenance action for the instrument to be performed on-site per maintenance requirements card associated with the instrument; (7) maintenance action for the instrument to be performed off-site at a laboratory;

means for enabling establishment of characteristic-mode rules, said characteristic-mode rules including: directing maintenance mode (1) for an instrument possessing instrument characteristic (b); directing maintenance mode (2) for an instrument possessing instrument characteristics (a), (d), and (f); directing maintenance mode (3) for an instrument possessing instrument characteristics (a), (d), and (e); directing maintenance mode (4) for an instrument possessing instrument characteristics (a), (c), (g), and (i); directing maintenance mode (5) for an instrument possessing instrument characteristics (a), (c), (g), (j) and (k); directing maintenance mode (5) for an instrument possessing instrument characteristics (a), (c), (h), and (k); directing maintenance mode (6) for an instrument possessing instrument characteristics (a), (c), (g), (j), (l) and (m); directing maintenance mode (6) for an instrument possessing instrument characteristics (a), (c), (h), (l) and (m); directing maintenance mode (7) for an instrument possessing instrument characteristics (a), (c), (g), (j), (l), and (n); directing maintenance mode (7) for an instrument possessing instrument characteristics (a), (c), (h), (l), and (n);

means for enabling storage of information directing a said maintenance mode for each instrument to which said computer program logic is applied, said directing being in accordance with said characteristic-mode rules and including consideration of data specific to the instrument for which said maintenance mode is being directed, said data including data pertaining to said instrument characteristics.

4. The computer program product of claim 3, wherein:
said instrument characteristics include (o) failure of the instrument is not intolerable with respect to any of operational system function, safety, and environment;
said maintenance modes include (8) no maintenance action to be performed;
said characteristic-mode rules include directing maintenance mode (8) for an instrument possessing instrument characteristic (o).

5. A method for prescribing individualized maintenance approaches for instrumentation implemented in the context of an operational system, said method comprising:

establishing instrument characteristics including: (a) the instrument is either the only instrument of its kind or the primary instrument of its kind; (b) the instrument is neither the only instrument of its kind nor the primary instrument of its kind; (c) the instrument is quantitatively indicative; (d) the instrument is not quantitatively indicative; (e) failure of the instrument is evident; (f) failure of the instrument is not evident; (g) condition-based maintenance strategy suggests that maintenance action for the instrument is deferrable; (h) time-based maintenance strategy suggests that maintenance action for the instrument is not deferrable; (i) deferring maintenance action for the instrument until a scheduled failure-finding task is justified; (j) deferring maintenance action for the instrument until a scheduled failure-finding task is not justified; (k) the instrument is part of a measurement chain; (l) the instrument is not part of a measurement chain; (m) maintenance action for the instrument can be performed on-site; (n) maintenance action for the instrument cannot be performed on-site; and establishing maintenance modes including: (1) comparison check of the instrument to be performed with respect to the primary instrument of its kind; (2) system operational check to be performed for the instrument; (3) repair or replacement of the instrument to be performed; (4) maintenance action for the instrument to be deferred; (5) system calibration procedure to be performed for the instrument; (6) maintenance action for the instrument to be performed on-site per maintenance requirements card associated with the instrument; (7) maintenance action for the instrument to be performed off-site at a laboratory;

establishing characteristic-mode rules including: directing maintenance mode (1) for an instrument possessing instrument characteristic (b); directing maintenance mode (2) for an instrument possessing instrument characteristics (a), (d), and (f); directing maintenance mode (3) for an instrument possessing instrument characteristics (a), (d), and (e); directing maintenance mode (4) for an instrument possessing instrument characteristics (a), (c), (g), and (i); directing maintenance mode (5) for an instrument possessing instrument characteristics (a), (c), (g), (j) and (k); directing maintenance mode (5) for an instrument possessing instrument characteristics (a), (c), (h), and (k); directing maintenance mode (6) for an instrument possessing instrument characteristics (a), (c), (g), (j), (l) and (m); directing maintenance mode (6) for an instrument possessing instrument characteristics (a), (c), (h), (l) and (m); directing maintenance mode (7) for an instrument possessing instrument characteristics (a), (c), (g), (j), (l), and (n); directing maintenance mode (7) for an instrument possessing instrument characteristics (a), (c), (h), (l), and (n);

recording direction of a said maintenance mode for each instrument to which said computer program logic is applied, said direction being in accordance with said characteristic-mode rules and including considering data specific to the instrument for which said maintenance mode is being directed, said data including data pertaining to said instrument characteristics.

6. The method for prescribing individualized maintenance approaches as recited in claim 5, wherein:

said instrument characteristics include (o) failure of the instrument is not intolerable with respect to any of operational system function, safety, and environment;

said maintenance modes include (8) no maintenance action to be performed;

said characteristic-mode rules include directing maintenance mode (8) for an instrument possessing instrument characteristic (o).

* * * * *